United States Patent
Lee

(10) Patent No.: US 11,765,607 B2
(45) Date of Patent: Sep. 19, 2023

(54) CELLULAR SITE MONITORING SYSTEMS AND METHODS

(71) Applicant: T-Mobile USA, Inc., Bellevue, WA (US)

(72) Inventor: Yun Hong Lee, Stafford, TX (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/504,731

(22) Filed: Oct. 19, 2021

(65) Prior Publication Data

US 2022/0038923 A1    Feb. 3, 2022

Related U.S. Application Data

(63) Continuation of application No. 16/514,501, filed on Jul. 17, 2019, now Pat. No. 11,178,559.

(51) Int. Cl.
*H04L 12/26* (2006.01)
*H04W 24/04* (2009.01)
*H04W 36/00* (2009.01)
*H04W 88/08* (2009.01)

(52) U.S. Cl.
CPC ....... *H04W 24/04* (2013.01); *H04W 36/0058* (2018.08); *H04W 88/08* (2013.01)

(58) Field of Classification Search
CPC .................................................. H04W 24/04
See application file for complete search history.

(56) References Cited

U.S. PATENT DOCUMENTS

| 5,526,413 A | | 6/1996 | Cheston, III | |
|---|---|---|---|---|
| 6,771,956 B1 | * | 8/2004 | Beeler | H04W 24/08 455/67.11 |
| 8,509,762 B2 | * | 8/2013 | Li | H04W 24/04 455/452.2 |
| 8,755,805 B2 | * | 6/2014 | Kumar | H04W 16/18 455/67.11 |
| 9,113,353 B1 | * | 8/2015 | Cotanis | H04W 24/02 |

(Continued)

FOREIGN PATENT DOCUMENTS

| GB | 2534938 A | * | 8/2016 | ............ H04W 24/02 |
|---|---|---|---|---|
| WO | WO-2016187841 A1 | * | 12/2016 | ............ H04L 41/00 |

OTHER PUBLICATIONS

Notice of Allowance dated Jul. 27, 2021 for U.S. Appl. No. 16/514,501 (pp. 1-11).

(Continued)

*Primary Examiner* — Guang W Li
(74) *Attorney, Agent, or Firm* — Loeb & Loeb LLP

(57) ABSTRACT

A computer-implemented method for improved monitoring of cellular sites. The method includes identifying a first base station of one or more base stations, where the first base station has a base station status that is a down status. The method includes determining that a connection failure alarm for the first base station has not been triggered. Based on the determination that the connection failure alarm for the first base station has not been triggered, the method includes determining that the first base station is connected to a mediation server associated with the first base station. Based on the determination that the first base station is connected to the mediation server, the method includes updating the base station status for the first base station to be an up status.

11 Claims, 5 Drawing Sheets

(56) References Cited

U.S. PATENT DOCUMENTS

| | | | |
|---|---|---|---|
| 9,258,719 B2 | 2/2016 | Tarraf | |
| 9,363,727 B2 | 6/2016 | Chou | |
| 9,369,886 B2 | 6/2016 | Tarraf | |
| 9,749,880 B2 | 8/2017 | Bao | |
| 10,120,779 B1 | 11/2018 | Leung | |
| 10,623,085 B2 | 4/2020 | Fox | |
| 11,178,559 B2* | 11/2021 | Lee | H04W 36/0058 |
| 11,635,224 B2* | 4/2023 | Kiryu | F24F 11/63 |
| | | | 700/29 |
| 2002/0123341 A1* | 9/2002 | Iyer | H04W 24/00 |
| | | | 455/446 |
| 2002/0155830 A1* | 10/2002 | Iyer | H04W 24/02 |
| | | | 455/446 |
| 2006/0059253 A1* | 3/2006 | Goodman | G06Q 10/10 |
| | | | 709/223 |
| 2007/0140133 A1* | 6/2007 | Gudipalley | H04L 41/065 |
| | | | 370/242 |
| 2008/0120430 A1* | 5/2008 | Redmond | H04L 65/80 |
| | | | 709/231 |
| 2009/0006010 A1* | 1/2009 | Van Sloun | H04L 41/149 |
| | | | 702/57 |
| 2009/0119655 A1* | 5/2009 | Quilty | G06F 8/65 |
| | | | 717/168 |
| 2009/0190472 A1* | 7/2009 | Wong | H04L 41/024 |
| | | | 370/231 |
| 2009/0203352 A1* | 8/2009 | Fordon | H04M 15/68 |
| | | | 455/406 |
| 2009/0252049 A1* | 10/2009 | Ludwig | H04W 72/1257 |
| | | | 370/252 |
| 2011/0044165 A1* | 2/2011 | Ni | H04W 24/04 |
| | | | 370/221 |
| 2011/0207450 A1* | 8/2011 | Siomina | G01S 5/02213 |
| | | | 455/422.1 |
| 2012/0302295 A1* | 11/2012 | Bishop | H04W 24/04 |
| | | | 455/574 |
| 2013/0010606 A1* | 1/2013 | Vikberg | H04L 12/66 |
| | | | 370/241.1 |
| 2013/0171983 A1* | 7/2013 | Zhang | H04W 52/0206 |
| | | | 455/422.1 |
| 2015/0087325 A1* | 3/2015 | Nuss | H04W 28/0808 |
| | | | 455/453 |
| 2015/0117204 A1* | 4/2015 | Lott | H04W 28/10 |
| | | | 370/235 |
| 2015/0146514 A1* | 5/2015 | Mahimkar | H04W 72/0473 |
| | | | 370/216 |
| 2016/0157240 A1 | 6/2016 | Dribinski | |
| 2016/0295432 A1 | 10/2016 | Tang | |
| 2017/0118672 A1 | 4/2017 | Zhang | |
| 2017/0181054 A1 | 6/2017 | Decerbo, Jr. | |
| 2017/0347299 A1 | 11/2017 | Dribinski | |
| 2020/0296607 A1 | 9/2020 | Sun | |
| 2020/0404728 A1 | 12/2020 | Yamine | |

OTHER PUBLICATIONS

Office Action dated Mar. 16, 2021 for U.S. Appl. No. 16/514,501 (pp. 1-15).

\* cited by examiner

CELLULAR SITE MONITORING SYSTEMS AND METHODS

CROSS-REFERENCE TO RELATED APPLICATIONS

This application is a continuation of U.S. application Ser. No. 16/514,501, filed Jul. 17, 2019, the disclosure of which is incorporated by reference herein in its entirety.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

A network provider, such as a cellular communications or data provider, may need to regularly determine the status of cellular sites making up its network to ensure that service is being provided consistently and reliably. When cellular sites go offline or otherwise encounter problems, the network provider may allocate resources to quickly troubleshoot the problem with the cellular site and limit negative user impact. If a cellular site is believed to be offline but is actually up and running, the time and resources allocated to address the perceived problem may be wasted. Limitations of traditional monitoring techniques may result in inaccurately monitoring cellular site status, which may take resources away from sites that truly need troubleshooting.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a computer-implemented method for improved monitoring of cellular sites. The method may include receiving base station status for one or more base stations. Based on an indication that a first base station has a down status, the method may include identifying a connection failure with a mediation server associated with the first base station. Based on the identification of the connection failure with the mediation server, the method may include identifying a neighbor base station to the first base station and determining that the neighbor base station includes recent performance management data associated with the first base station. Based on the determination that the neighbor base station includes recent performance management data, the method may include determining that the first base station is connected to the mediation server. Additionally, based on the determination that the first base station is connected to the mediation server, the method may include updating the base station status for the first base station to be an up status.

In another embodiment, the disclosure describes a computer-implemented method for improved monitoring of cellular sites comprising receiving base station status for one or more base stations from at least one operational support system (OSS) database, where the base station status may indicate whether each base station of the one or more base stations has an up status or a down status. The method may include identifying a first base station of the one or more base stations, where the first base station may have a down status. The method may include identifying a neighbor base station of the first base station and determining that performance management data for the neighbor base station includes substantially recent handover performance management data from the first base station. The method may include determining that the recent handover performance management data from the first base station is valid, updating the base station status for the first base station to be an up status, and providing an indication of the updated base station status of first base station via a graphical user interface.

In another embodiment, the disclosure describes a computer-implemented method for improved monitoring of cellular sites comprising receiving base station status for one or more base stations from at least one operational support system database where the base station status indicating whether each base station of the one or more base stations has an up status or a down status. The method may include determining that a first base station of the one or more base stations has a down status. Based on the determination that the first base station has a down status, the method may include identifying a connection failure between an operational support system associated with the OSS database and a mediation server associated with the first base station. Based on the identification of the connection failure between the operational support system and the mediation server, the method may include identifying a neighbor base station to the first base station and determining that the neighbor base station does not include recent performance management data associated with the first base station. Based on the determination that the neighbor base station does not include recent performance management data, the method may include updating the base station status for the first base station to be a down status and providing an indication of the updated base station status of first base station via a graphical user interface.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Network providers, such as entities providing cellular phone and data service, may use various hardware, software, or other tools and systems to maintain accurate and reliable status information related to the cellular sites that provide service to the entity's users. If a cellular site is down or its performance is substantially degraded, cellular coverage for the provider's users may be reduced, creating a negative service experience. Thus, obtaining accurate and reliable cellular site status for, e.g., 2G, 3G, and LTE networks may be important for network operations in order to troubleshoot efficiently and limit negative network performance. The present disclosure, in some embodiments, describes methods and systems for improving reliability of cellular site monitoring.

Figure 1:
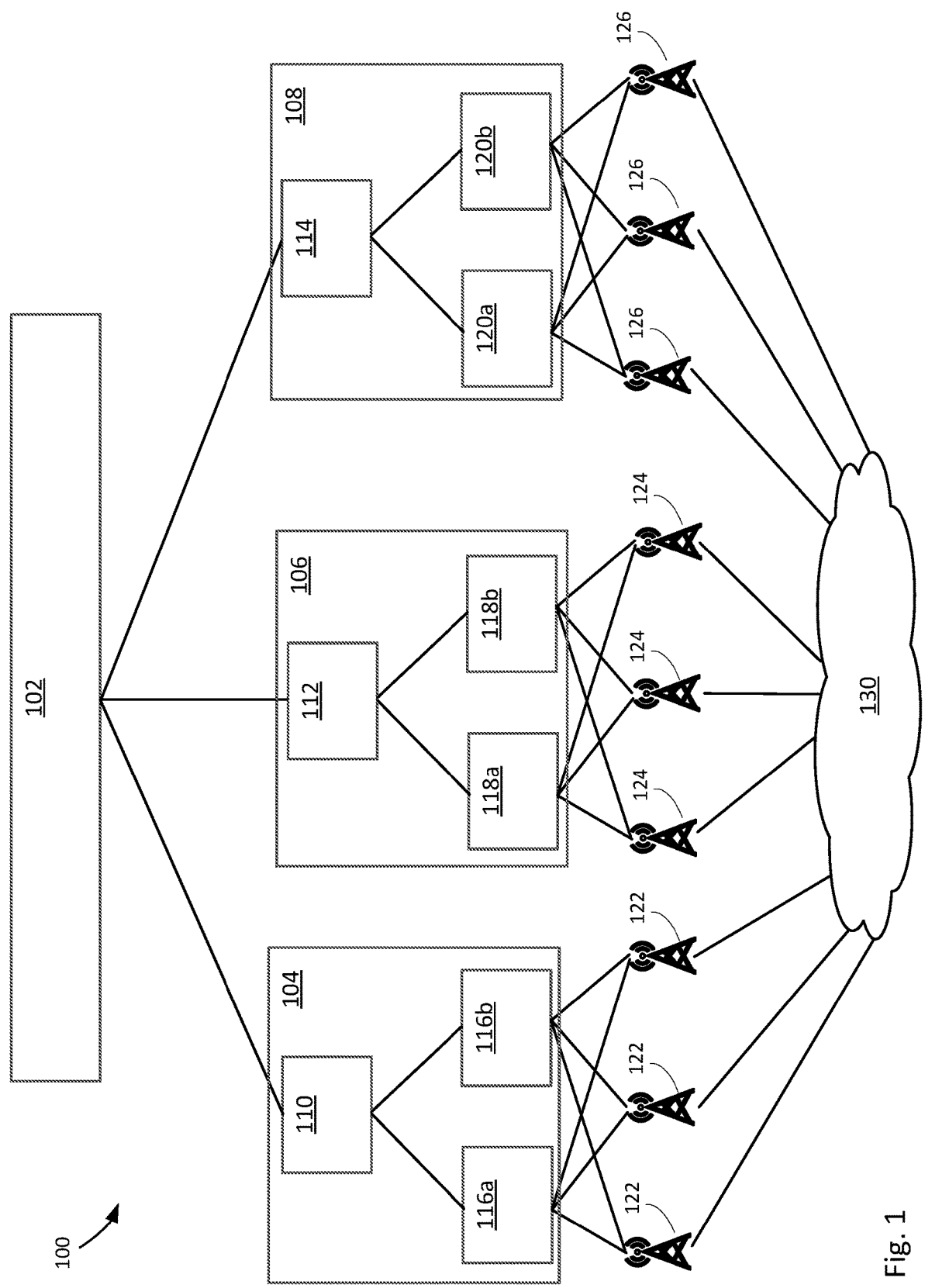
FIG. 1 is a system illustration of an embodiment of a system for cellular site monitoring in accordance with the disclosure.

FIG. 1 shows a high level diagram illustrating connection of components of a portion of a system 100 for cellular site monitoring as described herein. The system 100 may include a monitoring dashboard module 102, one or more network management systems 104, 106, 108, (e.g. Nokia NetAct), and a plurality of cellular site base stations 122, 124, 126. In some embodiments, the network management systems 104, 106, 108 may include one or more operational support systems (OSS) 110, 112, 114, respectively, and one or more mediation servers, such as integrated operation and mediation systems (iOMS) (e.g., LTE iOMS) 116a, 116b, 118a, 118b, 120a, 120b. In some embodiments, the cellular sites 108a-c may include a base station or wireless transceiver that may communicate directly with devices on a network 130. In some embodiments, the base stations 122, 124, 126 may include an Evolved Node B (i.e., E-UTRAN Node B) ("eNB" or "eNodeB"), for example, for some LTE cellular data networks. Although FIG. 1 illustrates nine base stations (three each of 122, 124, 126), it is contemplated that the system 100 may include substantially any number of base stations to expand the network 130 as desired. In some embodiments, the components of the system 100 may be connected via a digital communications network, such as the Internet, or a dedicated direct connection or private network. In some embodiments, the components may be connected wirelessly, such as through cellular technology known to those skilled in the art, or through wired connections.

In some embodiments, each of the eNB base stations 122, 124, 126 may be in communication, either wirelessly or hardwired, with one or more of the mediation servers (iOMS 116a-b, 118a-b, 120a-b). In some embodiments, the mediation servers may act as a gateway between the signals received from the eNB base stations 122, 124, 126 and translated to the OSS 110, 112, 114, described below. In some embodiments, the eNB base stations 122, 124, 126 may be connected to the respective iOMS 116a-b, 118a-b, 120a-b through a network management interface, such as a base transceiver station operation and maintenance (BT-SOM) interface. In some embodiments, each eNB base station 122, 124, 126 may be connected to two iOMS. In some embodiments, each cellular network market may have one or two iOMS, but may have more or fewer as desired or needed for market density. For example, in FIG. 1, each base station 122 may be connected to both iOMS 116a and iOMS 116b. For each base station 122, one of 116a-b may be designated a primary iOMS and the other may be designated a secondary iOMS. In some embodiments, by default, each eNB base station 122 may use its designated primary iOMS, but may establish connection with the secondary iOMS if a connection failure occurs with the primary iOMS. Similar primary/secondary configuration may be used for base stations 124, 126, and their respective iOMS. Alternatively, in some embodiments, each base station 122, 124, 126 may only be connected to a single iOMS, or may be connected to more than two iOMS. It will be recognized by those skilled in the art that each iOMS may support many eNBs.

The network provider may implement hardware and software resources to control, monitor, analyze, and manage its network, such as network 130. For example, the network provider may use one or more OSS 110, 112, 114 to support functionalities such as network configuration management, performance management, fault management, account and security management, network inventory management, service provisioning, etc. In some embodiments, each of the one or more iOMS 116a-b, 118a-b, 120a-b may communicate, either via a wireless or wired connection, with at least one of the one or more OSS 110, 112, 114. In some embodiments, each iOMS may communicate with respective OSS through a network interface, such as NetWork Interface V3 (NWI3) or common object request broker architecture (CORBA).

The network configuration management functionality may include controllers (e.g., iOMS 116a-b, 118a-b, 120a-b) and base stations (e.g., eNB 122, 124, 126) on each cellular site managed by the OSS. In some embodiments, network operators may update substantially any site configuration to optimize network quality using OSS. Performance management may include collecting all or substantially all of a network's performance data and storing it in the OSS or OSS database. In some embodiments, this data may include LTE or other site status such as site name, cell name, directory number (DN), cell global identity (CGI), cell bar status, locked/unlocked status, up/down status, cell type, etc. The performance data may then provide a reporting tool or analyzer, or may be exported to another system for analysis, such as OneData by T-Mobile. Fault management may provide functionality as a monitoring tool for an entity, such as a National Operation Center (NOC). In some embodiments, problems or other issues on a network may be reported, such as with an alarm that may indicate different levels of alarm severity. Account and security management may include controlling access privileges to the network generally and/or to specific portions of the network.

In some embodiments, cell site or base station status may be reported via one or more OSS graphical user interface (GUI) applications, such as a configuration management (CM) application (e.g., CM Editor). The CM GUI in the OSS 110, for example, may include various configuration and status parameters related to the base stations 122, and similar relationships for OSS 112, 114. In some embodiments, the CM GUI may include status or values for some basic parameters, such as nominal power and operational state. The value for the operational state may indicate whether a particularly base station is enabled and functioning properly, i.e., "up" or "down." In some embodiments, the CM GUI in the OSS may check a single base station status at a time.

In some embodiments of the system 100, the monitoring dashboard 102 may act as a central platform to receive and process data and information related to the status of substantially every cellular site base station 122, 124, 126 in the network 130. In some embodiments, the monitoring dashboard 102 may receive data from one or more OSS, such as OSS 110, 112, 114. Although only three OSS are shown in FIG. 1, it should be understood that the system 100 may include any number of OSS. Alternatively, although multiple OSS are shown in FIG. 1, it is contemplated that, in some embodiments, the system 100 may only include a single OSS that processes and manages data from each cellular site. In some embodiments, each OSS may manage thousands of cellular site base stations covering various markets. In some embodiments, each OSS may transmit all or substantially all of the status data for each cellular site base station to the monitoring dashboard 102. The monitoring dashboard 102 may monitor and display when a particular cellular site base station is down or otherwise not functioning properly. In some embodiments, the monitoring dashboard 102 may include an application such as a disaster recovery (DR) widget that may display when cellular site base station that are down in substantially real time.

Figure 2:
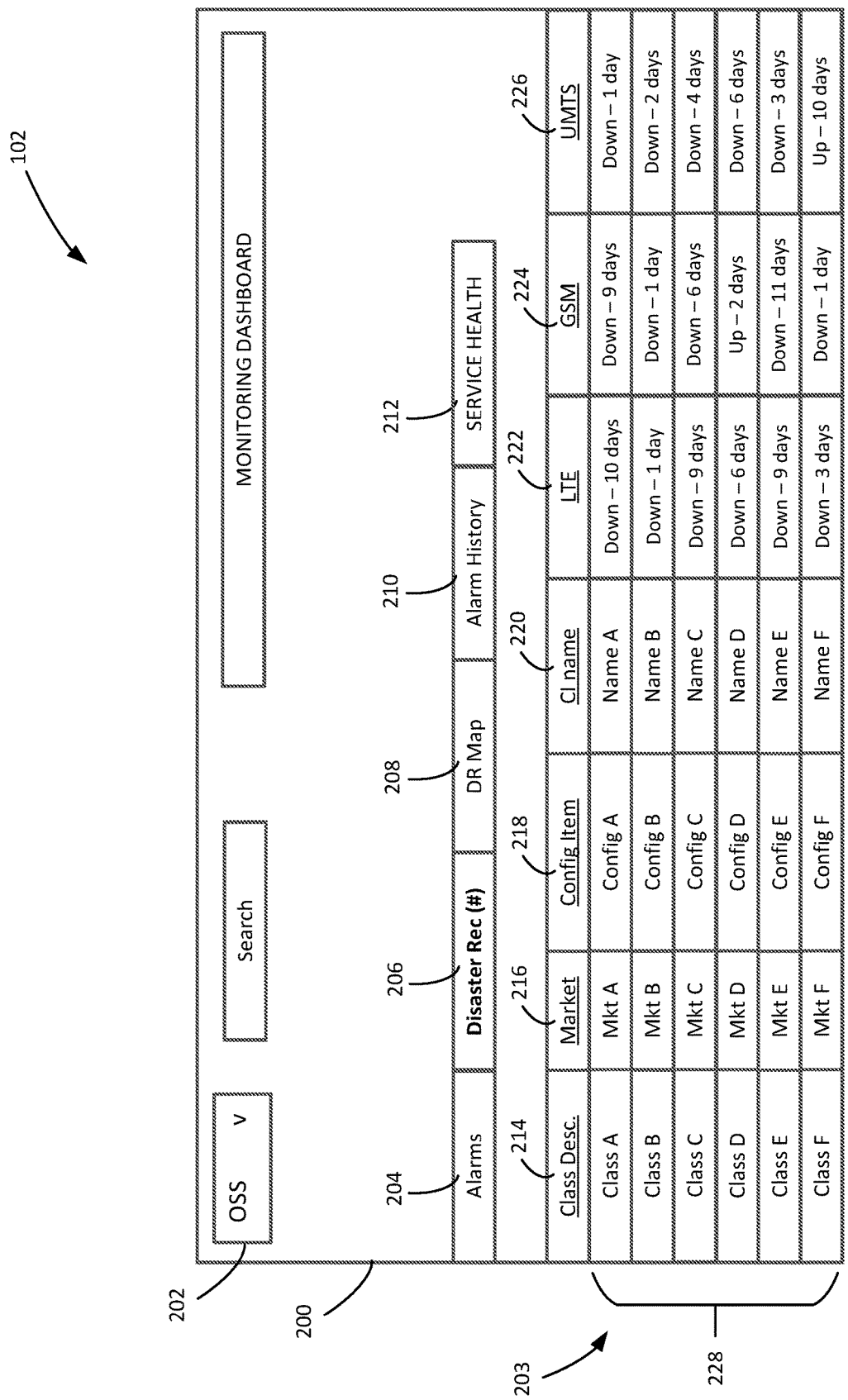
FIG. 2 is an embodiment of a graphical user interface of a monitoring dashboard module of the system of FIG. 1.

FIG. 2 shows a screenshot of an embodiment of a graphical user interface (GUI) of the monitoring dashboard 102. In some embodiments, a dashboard window 200 of the GUI may include an OSS selector 202, which may allow a user to toggle between various OSS, such as OSS 110, 112, 114. In some embodiments, the dashboard window 200 may include information from every OSS without changing between them with the selector 202. The dashboard window 200 may also include one or more widgets that may be selected for display in the display portion 203. The dashboard window 200 in FIG. 2 includes widget selections for Alarms 204, Disaster Recovery 206, Disaster Recovery (DR) Map 208, Alarm History 210, and Service Health 212. In some embodiments, selecting the buttons for each widget may display the related status and information in the display portion 203. For example, selecting the Alarms 204 button may display any current alarms in the display portion 203, and selecting Alarm History 210 may display alarm history data.

The embodiment of the dashboard window 200 in FIG. 2 shows the Disaster Recovery 206 button selected to display data on disaster recovery in the display portion 203. In some embodiments, the disaster recovery 206 button may display a list of the base stations that may down or otherwise encountering problems that may affect network service. When the disaster recovery 206 widget is selected, the display portion 203 may display rows 228 for each base station affected, and columns 214-226 for different parameters for each site. For example, the embodiment in FIG. 2 includes columns for CI class description 214, market 216, config item 218, CI Name 220, LTE 222, GSM 224, and UMTS 226. In this context, LTE (i.e., Long-Term Evolution), GSM (i.e., Global System for Mobile Communication), and UMTS (i.e., Universal Mobile Telecommunications Service) may be some of the multiple different types of networks supported by the base stations transmitting information to the OSS, and it is contemplated that other embodiments may include more or fewer or these types of networks. Although three types of cellular networks are shown in the embodiment of the dashboard window 200 of FIG. 2, it is contemplated herein that more or fewer cellular networks, or other types of cellular networks, such as 5G, may additionally or alternatively be shown in the dashboard.

The LTE column 222 in the display portion 203 with the disaster recovery widget 206 selected may show the down time or up time for the cellular site base station listed in each respective row. For example, in the embodiment of the dashboard window 200 the LTE network functionality of the base station with CI name "Name A" has been offline (i.e., "down") for 10 days, and the CI name "Name B" has been down for 1 day, etc. Similar information is provided in the GSM column 224 and the UMTS column 226 for GSM and UMTS for the network functionality of those networks. It is contemplated, however, that not all base stations may include antennas or otherwise functionality for each type of network. For example, some base stations may only support the LTE network, while others may only support GSM or UMTS.

Having all or substantially all "down" base stations displayed in a central monitoring dashboard, such as the dashboard window 200, may enable the network provider to commence troubleshooting activities quickly and substantially limit downtime and the effect on the network, such as network 130. If the dashboard window 200 of the monitoring dashboard 102 incorrectly indicates on the disaster recovery widget 206 that a cellular site base station is down for a particular network, the network provider may unnecessarily expend resources in troubleshooting efforts and time to fix the site that is perceived to be down, but is in fact "up" and functioning. These resources may be more efficiently expended on troubleshooting base stations of the network that are actually not functioning, as opposed to those with false alerts.

In some embodiments, a site status script may run periodically (e.g., every 15 minutes) to update the status of each base station's functionality in each network (e.g., via Resolve Runbook. In some embodiments, separate scripts may run for each network, i.e., for the LTE network, the GSM network, the UMTS network, etc. In some embodiments, the status of each of the base stations in each network may be collected and displayed through the monitoring dashboard 102 and updated in substantially real time. In some embodiments, the status may be updated periodically, such as every few minutes, ever two minutes, every five minutes, every ten minutes, every fifteen minutes, etc. In some embodiments, the site status script may be run on-demand, if desired.

In some embodiments, the site status script may include collecting the most accurate base station cellular site status for each network available from each OSS and transmitting that status to the monitoring dashboard 102. For example, a site status script may include determining the most current and accurate status for each base station 122, 124, 126 monitored in each respective OSS 110, 112, 114, and displaying the updated status in the display portion 203 of the dashboard window 200. In some embodiments, the status data for each base station may occur using a compilation language instead of or in addition to a script language. In some embodiments, the information for each base station may include the site name, cell global identity (CGI), cell name, OSS, directory number (DN), cell ID, etc. In some embodiments, the site status for per cell site or base station may be barred/unbarred, locked/unlocked, up/down, maintenance on/off. For the sake of simplicity in illustration, when the term "up/down" may be used throughout to refer to any of barred/unbarred, locked/unlocked, maintenance on/off.

In some embodiments, the site status script may go beyond updating up/down status for each base station through checking the respective status parameters in each OSS and/or OSS database. For example, it is possible that a base station's status as reflected by the OSS may not accurate for any of a variety of reasons, such as an unreliable connection between the OSS and the particular base station due to syncing issues or other problems. In some embodiments, data sync issues for an LTE network may occur between a particular eNB site (e.g., base stations 122, 124, 126) and their respective OSS (e.g., 110, 112, 114). In some embodiments, a base station for a network (e.g., an LTE network), such as base station 122, may lose an operations and maintenance (O&M) link, such as via an iOMS 116a, 116b. In such an instance, the actual status of the base station site 122 may not be synchronized with the OSS 110 because communication between the base station and the OSS may be lost. In such cases, the status in the OSS 110 may indicate an old, non-updated status of the base station 122. In other embodiments, the base station 122 site status in the OSS 110 may not be updated if the base station itself is, for example, abruptly powered down without sending any update information to the OSS. In such instances, the base station site 122 may be disconnected in its respective iOMS 116a, 116b, and the base station site status may not be synchronized with the OSS 110.

In such instances, the base station cellular site may, in fact, but active and functional, but the OSS may indicate that that particular base station is down, or vice versa. Accordingly, some embodiments of the system 100 may employ a site status script that performs additional checks to determine the most accurate base station status. In some embodiments, the site status script may include checking alarm status and performance management (PM) data from each particular base station. In some embodiments, the additional checks performed to determine the most accurate base station status may be run as part of the site status script checking the OSS status, or may run as an additional algorithm to provide more reliable information on base station site status.

Figure 3:
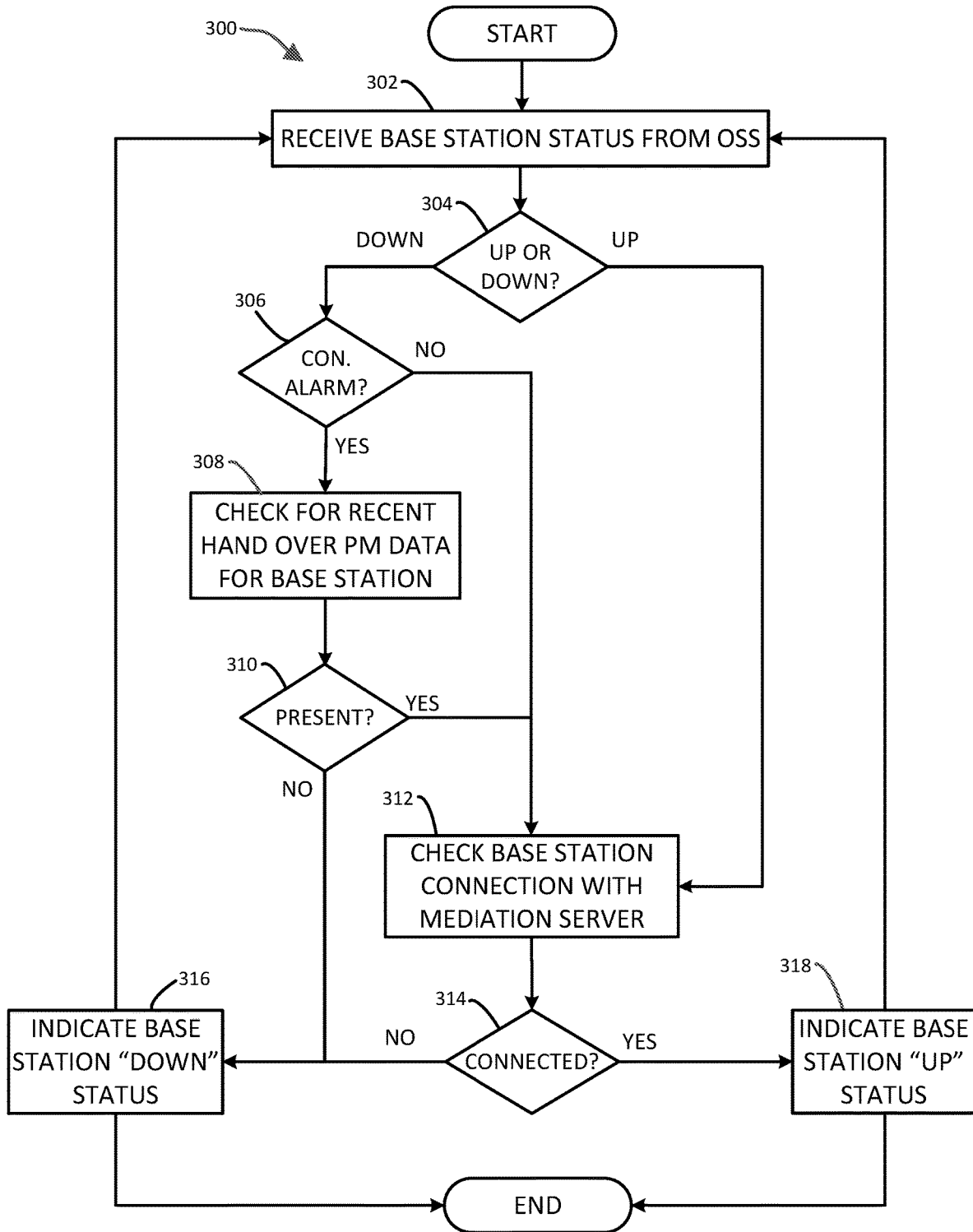
FIG. 3 is a flowchart of an embodiment of a method of cellular site monitoring using the system of FIG. 1.

FIG. 3 shows a flow chart of a method 300 of using an embodiment of a cellular site monitoring system. In some embodiments, the method 300 may be implemented with the components of an LTE network, but it is contemplated that other types of networks may be used as well or in the alternative. The method 300 may include, at 302, receiving base station site status from one or more base stations, such as from the OSS database associated with the OSS monitoring those particular base stations. At 304, the system may determine the up/down status for the one or more base stations determined as indicated by the OSS. As described above, however, in some embodiments, it is possible that the up/down status indicated by OSS may be incorrect. If, at 304, the OSS indicates that a particular target base station is up, the system may, at 312, check the base station's connection with the base station's respective mediation server (as described in more detail below). If, at 304, the OSS indicates that a particular base station is down, the system may, at 306, determine whether an operation & maintenance (O&M) connection failure alarm has been triggered, such as by the OSS or by the mediation server (e.g., iOMS) associated with the base station in question. In some embodiments, the connection failure alarm may indicate that there is a connection problem between the OSS and the mediation server, which may indicate that the site status data in the OSS may not be accurate. In some embodiments, if the system determines, at 306, that the connection failure alarm is not been triggered, then the system may, at 312, check the base station connection with the base station's respective mediation server, as described in more detail below.

If the systems determines that the connection failure alarm has been triggered, then the system may, at 308, check recent hand-over performance management (PM) data from a neighbor base station cellular site (e.g., another base station that is geographically near the base station site, such as in the same market, within a predetermined radius, or through the same iOMS). In some embodiments, hand-over PM data may include data passed between neighboring or nearby eNB base stations to perform various network tasks that will be known to those skilled in the art. If a neighbor base station cellular site includes recent (e.g., within 30 minutes or so) hand-over data from the base station in question (i.e., the base station with a "down" status in OSS), then this may indicate that the base station cellular site in question is functioning, even if the OSS has indicated otherwise. In some embodiments, the hand-over PM data may be stored on a mediation server (e.g., iOMS) that communicates with both the base station and its neighboring base station. In some embodiments, the system may check for hand-over PM data existing with a neighbor base station within a predetermined time period, such as 5 minutes, 10 minutes, 15 minutes, 20 minutes, 30 minutes, 1 hour, 12 hours, 24 hours, 48 hours, etc. In some embodiments, at 310, the system may determine whether recent hand-over PM data is present from neighboring base stations. If not, then the system may confirm that the target base station is indeed not functioning properly, and may, at 316, display or cause to display the base station status as "down" in the monitoring dashboard.

If, at 310, the system determines that hand-over PM data from the target base station is indeed present (i.e., stored) at the neighbor base station, the system may, at 312, check the base station connection with the mediation server. In some embodiments, this may include checking the particular eNB base station connection status from the mediation server (e.g., iOMS). In some embodiments, the base station's connection with the mediation server may reflect the actual status of the base station, or may be more accurate than the status indicated by the OSS. If, at 314, the system determines that the base station (e.g., eNB) is disconnected, the system may, at 316, display or indicate to the monitoring dashboard that the target base station cellular site is "down." If the connection remains down for multiple days, in some embodiments, the dashboard window 200 in the monitoring dashboard 102 may toll the number of days a base station has been down. If, at 314, the system determines that the base station eNB is connected, the system may transmit to or cause the monitoring dashboard to display that the base station in question is "up." In some embodiments, the base station may not be displayed in the DR widget display portion 203 at all, and may remain for a certain time period after recovery in other embodiments. Accordingly, using the method 300, the system may make a more accurate determination of the up/down status of any particular base station in a network, such as a 4G LTE network.

In some embodiments, the system 100 may additionally include narrowband internet-of-things (NBIoT) capabilities, such as included in the base stations. NBIoT may enable efficient low-band communication and extended battery life for mass distributed electronic devices, and may use established networks, such as the network 130 and LTE networks, to connect to those devices. In some embodiments, NBIoT may utilize LTE network provider's existing assets, such as sites, base stations, antennae, backhaul, and licensed spectrum. For example, in some embodiments, some or all eNodeB site may host a corresponding NBIoT site or other equipment to utilized the LTE network operated by the eNodeB sites and/or base stations, or on GSM networks. While not illustrated in FIG. 3, the method 300 may additionally include that the monitoring dashboard indicate the cell status of each NBIoT site may be inherited from its respective host eNodeB site. Thus, the method 300 may additionally include indicating each respective NBIoT site as "up" or "down" depending on the status of its host base station.

Figure 4:
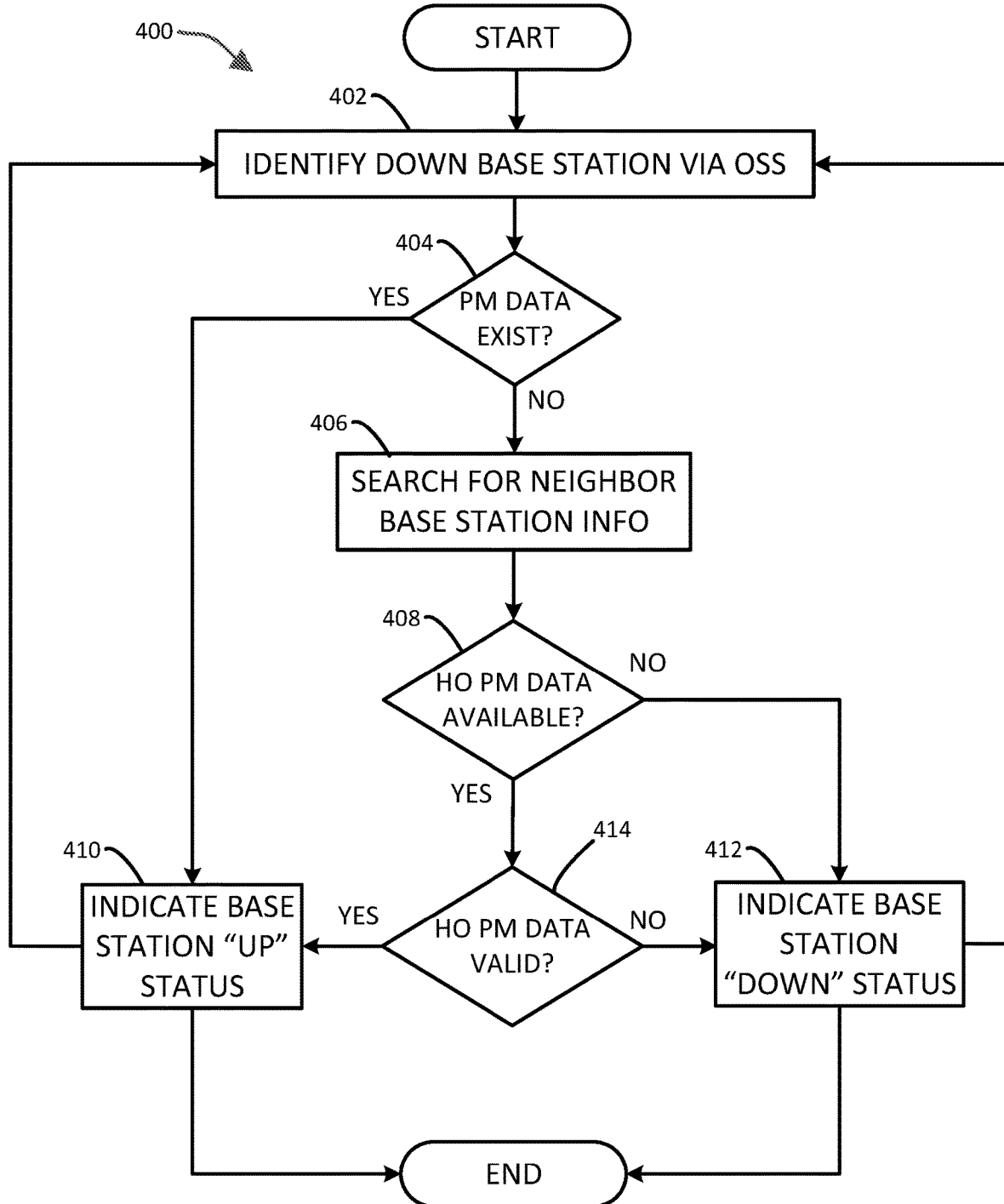
FIG. 4 is a flowchart of another embodiment of a method of cellular site monitoring using the system of FIG. 1.

FIG. 4 illustrates a flow chart of another embodiment of a method 400 of using an embodiment of a cellular site monitoring system. The method 400 may be executed as part of the method 300 shown in FIG. 3, or may be run as a separate script or method in the system. At 402, the system may identify one or more base stations that are disconnected and/or unsynchronized with the OSS or the monitoring dashboard, or otherwise indicated as "down." At 404, the system may determine whether current or substantially recent performance management (PM) data exists for each of the one or more base station sites that are indicated as "down." If yes, the system may, at 410, may indicate and update that the status of the base station in question is "up." If no current or recent PM data exists for the base station, the system may include, at 406, searching for neighbor base station information, such as site name, site ID, EUtranCellRelation ID, handover PM data, etc. If, at 408, the system determines that no handover PM data is available at the neighbor base station for the base station in question, the system may, at 412, indicate that the base station is disconnected and the status is "down." If, at 408, the system determines that handover PM data from the base station in question is available from the neighbor base station, the system may determine, at 414, whether the identified handover PM data is valid. If not, the system may indicate, at 412, that the base station's status is "down." If the handover PM data identified at the neighbor base station is determined to be valid, then the system may, at 410, indicate that the base station's status is "up."

Figure 5:
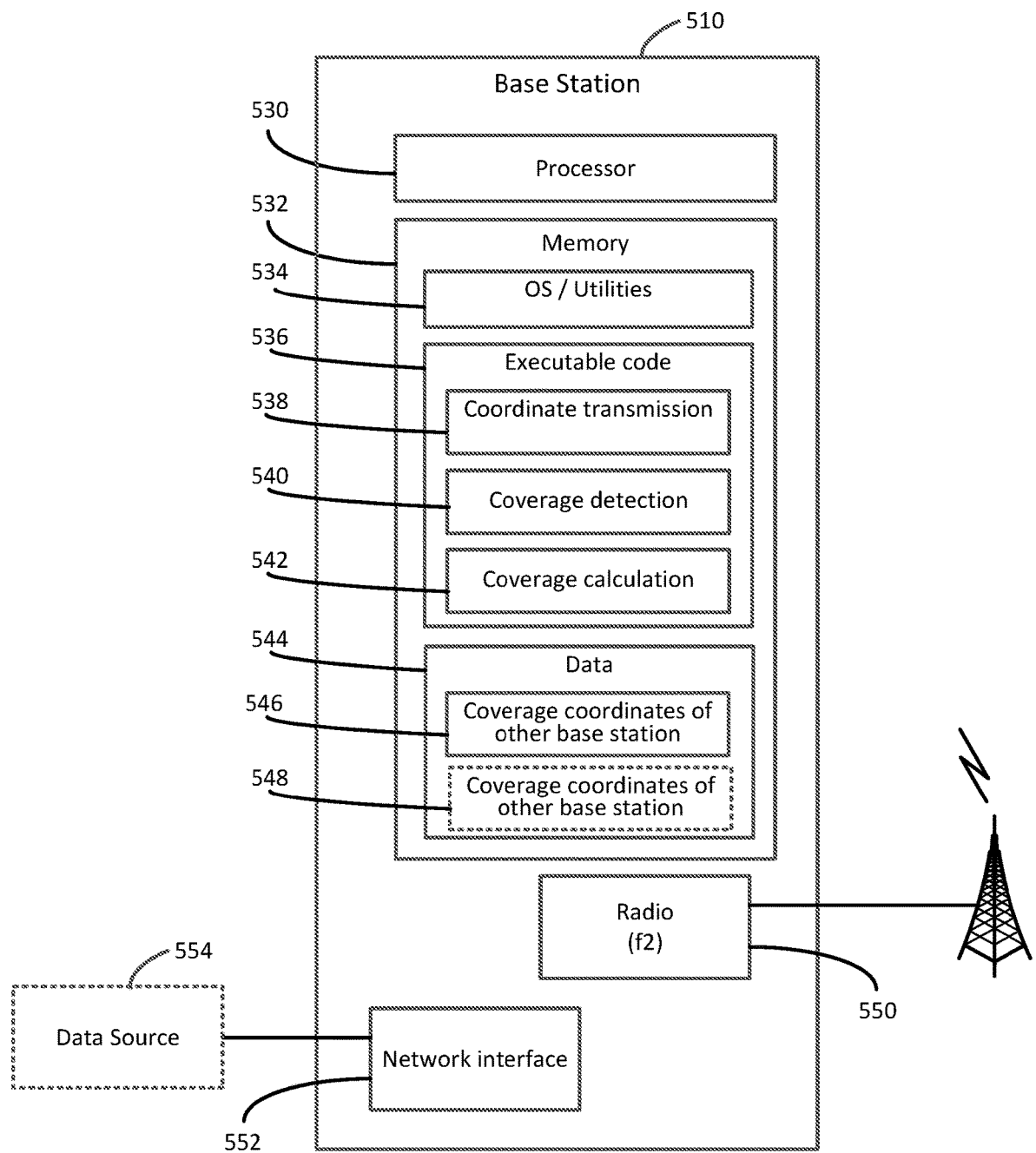
FIG. 5 is a block diagram of an exemplary base station configured for operation in the system of FIG. 1.

FIG. 5 illustrates a block diagram of an exemplary base station 510 in accordance with the current disclosure. In some embodiments, base station 510 may be representative of base stations 122, 124, 126 in system 100, but it will be understood by those skilled in the art that other base station configurations may be used consistent with the disclosure. The base station 510 may include a processor 530 that is in communication with a memory 532. The memory 532 may include an operating system and utilities 534 used to manage operations of the base station including booting, memory management, communications, error handling, software updates, etc. The memory 532 may also store executable instructions 536 and data 544.

The base station 510 may have a radio 550 operating at a frequency band that provides for a coverage for a particular area. In some embodiments, the base station 510 may operate in a frequency band in the 700 MHz frequency range with a coverage radius of as much as 7 kilometers. In some systems, wide area coverage may be provided by an overlapping network of similar band radios, operating at up to 2.5 GHz, but having similar coverage areas. 4G LTE network is such an example. In such systems, an electronic device may tell one base station when it is getting a stronger signal from another base station so that a handoff between base stations can be executed. In some embodiments, handoff PM data may be passed between neighboring base stations to accommodate such handoffs.

In some 5G (fifth generation cellular) standard, a mixed system of low band (e.g., 700 MHz base stations) may be intermixed with millimeter wave radios operating in frequency bands around 50 GHz. These so called NR (new radio) radios may have a coverage radius of 500 meters or less depending on terrain and other obstructions. The 5G implementation may mix these bands with significantly different coverage areas.

The base station 510 may also include a network interface 552 used for routing traffic from land-based switch gear (not depicted). The network interface 552 may also communicate with an external data source 554 in some embodiments.

The executable instructions 536 may include various modules or routines that are used for location-matrix based band scanning. For example, in an embodiment, the memory 532 may include a coordinate transmission module 538, a coverage detection module 540, and a coverage calculation module 542. The data 544 may include coverage coordinates 546, or descriptors, of the coverage area of other base stations. The data 544 may also include coverage coordinates 548 for other base stations (not depicted) having small coverage areas compared to that of the base station 510.

The coordinate transmission module 538 may be responsible for determining when an electronic device is in the coverage area of the base station 510 and to transmit coordinates of one or more smaller coverage areas to the electronic device. In some embodiments, the coverage area may only be partially within its own coverage area, if at all. The coordinate transfer may be over the broadcast channel as data or may be transmitted over a control channel, as bandwidth permits.

Another code module may be the coverage detection module 540. Coverage detection may involve receiving location information from the electronic device as the electronic device is handed off either to or from a neighbor base station. This location information may be combined with location information from other devices at the coverage calculation module 542 to form a locus of points defining the coverage boundary. The coordinate data 546 may then be updated accordingly. The updated location information may be valuable especially in the case of millimeter wave systems, where some atmospheric conditions, temporary construction, etc. may affect broadcast range. In another embodiment, coverage coordinates 546 may be received at the base station 510 from an external data source 554. The base station 510 may provide the location information from the electronic device regarding coverage boundaries to the external data source 554 for use in refine the descriptors for the coverage area. In other embodiments, the coverage coordinates 546 may be determined by survey at the time of installation of the base station 510 or may be independently updated separate from any live use by the electronic device.

At least one technical effect of the system and methods described above is an increased accuracy in diagnosing and indicating which base stations in a cellular network, such as a 4G LTE network, are truly down. This technical effect solves at least the technical problem of automatically determining which of potentially thousands of base stations are in need of troubleshooting, as opposed to merely false alarms. Reducing false alarms may increase the efficient use of troubleshooting resources, allowing limited resources to be deployed to locations more likely to be experiencing outages. Improved troubleshooting efficiency may then lead to solving the technical problem of network downtime, as resources will be focused on more quickly repairing base stations that are actually experiencing down time and not wasted determining that the subject of a false alarm is actually not down. Decreased network downtime may result in increased network reliability and increased customer satisfaction with the network.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for improved monitoring of cellular sites, the method comprising:
   identifying a first base station of one or more base stations, the first base station having a base station status that is a down status;
   determining that a connection failure alarm for the first base station has not been triggered;
   based on the determination that the connection failure alarm for the first base station has not been triggered, determining that the first base station is connected to a mediation server associated with the first base station;
   based on the determination that the first base station is connected to the mediation server, updating the base station status for the first base station to be an up status;
   identifying a second base station of the one or more base stations, the second base station having a down status;
   based on an indication that the second base station has a down status, identifying that a connection is functioning between a mediation server associated with the second base station and an operational support system associated with an operational support system (OSS) database;
   determining that the second base station is connected to the mediation server associated with the second base station; and
   based on the determination that the second base station is connected to the mediation server, updating the base station status to be an up status;
   wherein the method is performed using one or more processors.

2. The method of claim 1 further comprising providing an indication of the updated base station status for the first base station via a graphical user interface.

3. The method of claim 1, wherein the base station status for the one or more base stations is received from the OSS database.

4. The method of claim 3, wherein the connection between the mediation server and the first base station is between the operational support system associated with the operational support systems databases and the mediation server associated with the first base station.

5. The method of claim 1 further comprising:
   identifying a third base station of the one or more base stations, the third base station having an up status;
   determining that the third base station is not connected to a mediation server associated with the third base station; and
   based on the determination that the third base station is not connected to the mediation server associated with the third base station, updating the base station status to be a down status.

6. A computer-implemented method for improved monitoring of cellular sites, the method comprising:
   determining that a first base station of one or more base stations has a down status;
   based on the determination that the first base station has a down status, determining that a connection failure alarm for the first base station has been triggered;
   based on the determination that the connection failure alarm for the first base station has been triggered, identifying a neighbor base station to the first base station;
   determining that the neighbor base station does not include performance management data associated with the first base station within a predetermined time period;
   based on the determination that the neighbor base station does not include performance management data within the predetermined time period, updating the base station status for the first base station to be a down status;
   determining that a second base station of the one or more base stations has a down status;
   identifying a neighbor base station of the second base station;
   determining that performance management data for the neighbor base station includes substantially recent handover performance management data from the second base station;
   updating the base station status for the second base station to be an up status; and
   providing an indication of the updated base station status of the second base station via the graphical user interface;
   wherein the method is performed using one or more processors.

7. The method of claim 6, wherein the recent performance management data is within the previous 30 minutes.

8. The method of claim 6, wherein the recent performance management data is within the previous 24 hours.

9. The method of claim 6, wherein the recent performance management data associated with the first base station is handover performance management data.

10. The method of claim 6 further comprising:
   determining that a third base station of the one or more base stations has an up status;
   determining that the third base station is not connected to a mediation server associated with the third base station; and
   based on the determination that the third base station is not connected to the mediation server, updating the base station status to be a down status.

11. The method of claim 10 further comprising providing an indication of the updated base station status of the first base station, second base station, and the third base station via a graphical user interface.

* * * * *